Jan. 26, 1960     C. P. SEVIGNY     2,922,384
MANUFACTURE OF RIBBON CANDY

Filed Aug. 8, 1955     4 Sheets-Sheet 1

Inventor:
Charles P. Sevigny,
by Robert D. Thomson
Attorney

Jan. 26, 1960 C. P. SEVIGNY 2,922,384
MANUFACTURE OF RIBBON CANDY
Filed Aug. 8, 1955 4 Sheets-Sheet 2

Inventor:
Charles P. Sevigny
by Arthur D. Thomson
Attorney

Jan. 26, 1960     C. P. SEVIGNY     2,922,384
MANUFACTURE OF RIBBON CANDY
Filed Aug. 8, 1955     4 Sheets-Sheet 3
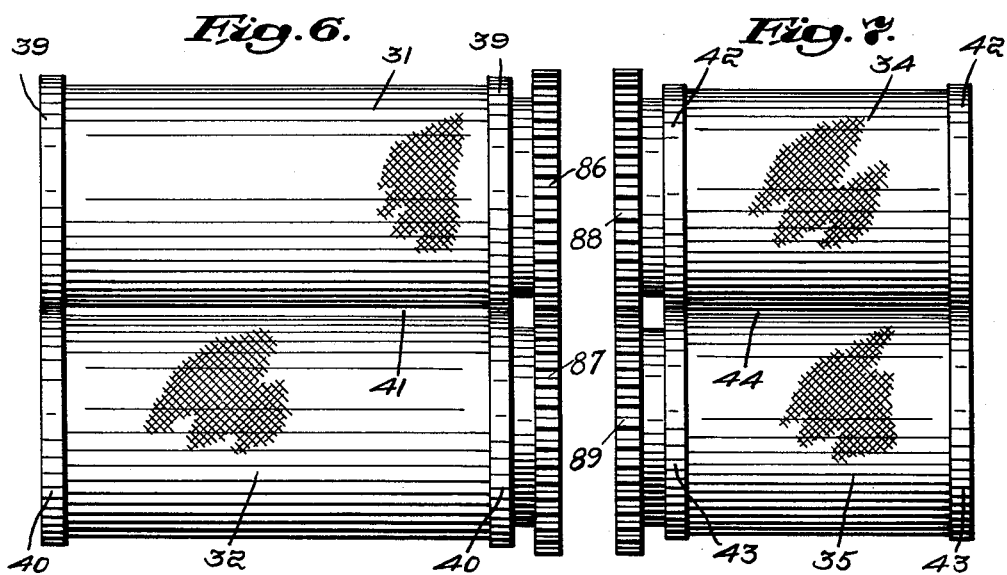
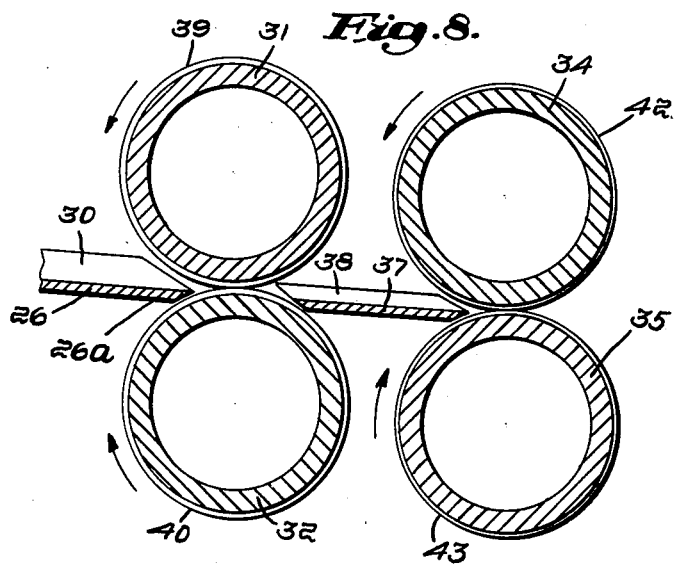
Inventor:
Charles P. Sevigny,
by Arthur D. Thomson
Attorney

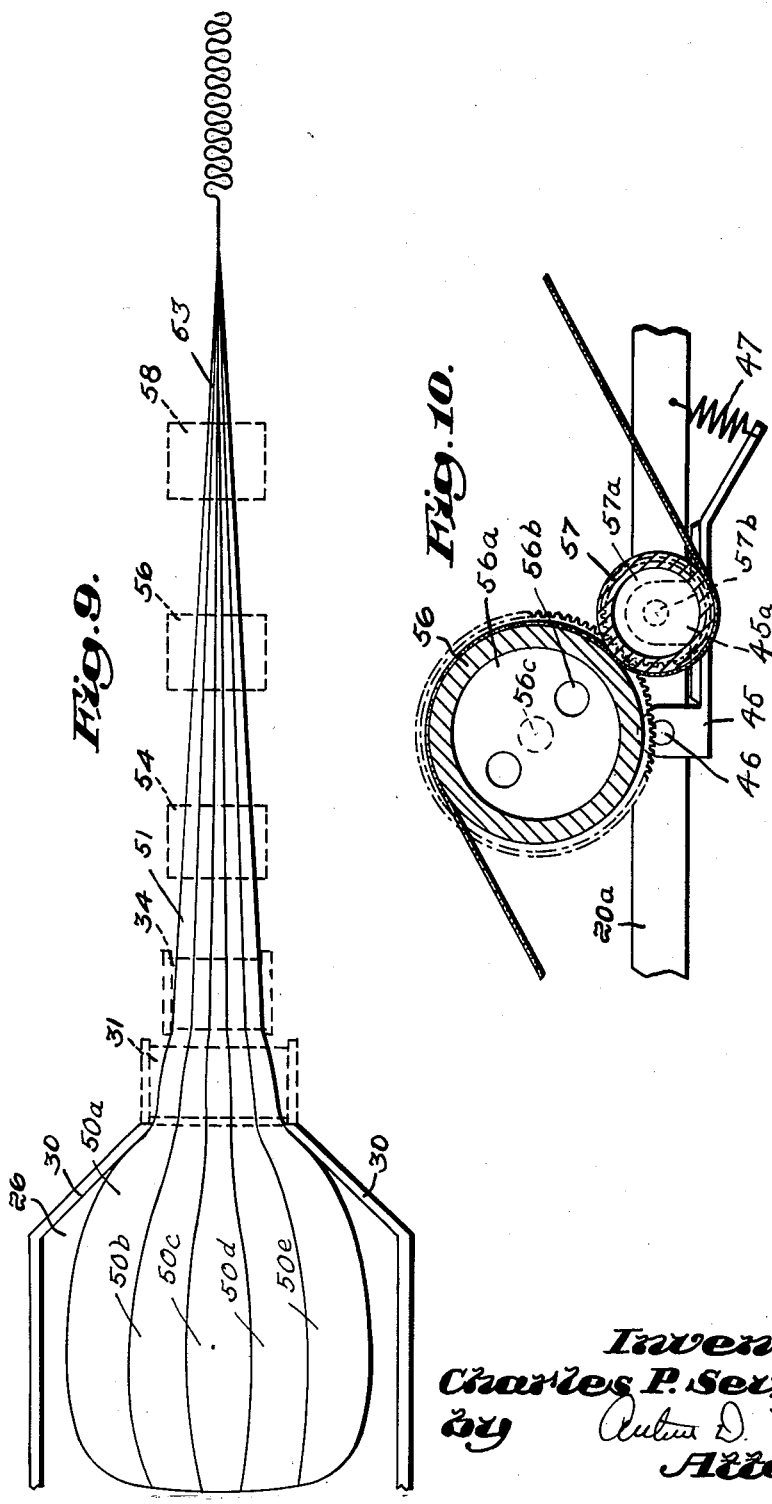

United States Patent Office 2,922,384
Patented Jan. 26, 1960

2,922,384

MANUFACTURE OF RIBBON CANDY

Charles P. Sevigny, Hanover, Mass.

Application August 8, 1955, Serial No. 526,907

3 Claims. (Cl. 107—4)

This invention relates to the manufacture of ribbon candy, and pertains more particularly to a machine and method for forming and spinning ribbon candy.

The principal purpose of the invention is to provide a durable and efficient machine capable of automatic, high speed production of high quality ribbon candy. Another object is to provide a machine which imparts to the candy the grained texture and polished finish of the familiar hand spun product, and which produces candy of more uniform thickness and width than has heretofore been obtainable by hand spinning, or by hand feeding to mechanical spinning apparatus.

Other objects of the invention are to provide a machine which may be run continuously, utilizing successive batches of cooked hard candy, of various colors and flavors, without interruption and with a minimum of waste or scrap, thereby materially reducing the cost and the time required in making the finished product, and which substantially eliminates the constant attention and considerable physical effort heretofore required of the candy maker for hand turning and hand feeding separate batches, as well as for hand spinning ribbon candy.

Further objects of the invention are to provide an automatic machine and method for progressively sizing a candy slab, in successive feeding stages, into a band and progressively stretching the sized band through successive spinning stages to produce extremely thin ribbons of uniform strength, as well as uniform size, thereby reducing breakage during and after packing, thus substantially reducing unproductive delays in the packaging department as well as in the production department.

According to the method here disclosed, a batch of hot, plastic hard candy, originally in the form of a relatively thick and flat slab of indefinite size is first placed on a table, which is maintained at any even temperature and vibrated to prevent the candy from sticking. Candy is continuously drawn from the batch and formed into a band of uniform predetermined width and thickness. The band is then stretched, for example, by running it through pairs of spinning rolls driven at progressively increasing rim speeds, into the form of a ribbon of the desired finished width and thickness; and finally the ribbon is crimped to the corrugated shape in which the product is ordinarily sold.

The machine here disclosed consists, in general, of a heated table, two or more pairs of feed rolls and guides which accurately size the band, one or more pairs of spinning rolls, and a crimping mechanism, all arranged so that the candy passes form one mechanism to another in a continuous operation. Temperature controls for maintaining the batch in plastic condition, and suitable speed controls for insuring the desired speed relationship of the successive operations are provided. It will be understood that the particular machine here described in connection with the accompanying drawings represents a preferred embodiment of the invention, and that the structural details of the apparatus herein disclosed, particularly the driving mechanism, which may be of conventional type and which is shown diagrammatically, may be varied to satisfy the conditions of a desired installation, without departing from the essence of this invention as defined in the appended claims.

Batches of hard candy for making ribbon candy in the manner disclosed, may be prepared and cooked in accordance with common procedures. Ordinarily the base formula comprises sugar and corn syrup, in suitable proportion. Before it is placed in the machine, the cooked batch may be pulled, in any usual manner, to improve the texture and flavor of the candy, and separate portions of the batch may be treated with different flavoring and coloring agents, and combined to produce striped candy. By the machine and process herein disclosed the alignment of different colored stripes, as well as the texture and grain of the ribbon candy, is substantially improved.

In the drawings illustrating a preferred embodiment of the invention,

Fig. 4 is an enlarged, fragmentary plan view of the tilting guide and crimper;

Fig. 5 is an enlarged fragmentary section through the crimper, taken on line 5—5 of Fig. 1;

Fig. 6 is an enlarged elevation of a pair of primary feed, or pre-feeding, rolls shown in Figs. 1 and 2;

Fig. 7 is an elevation to the same scale as Fig. 6, of a pair of secondary feed rolls, also shown in Figs. 1 and 2;

Fig. 8 is a transverse section, illustrating the relative positions of the primary and secondary feed rolls, and showing a platform for supporting and guiding the partially shaped band of candy in its path from the primary to the secondary rolls;

Fig. 9 is a schematic plan view of the candy as it appears in various stages of its travel through the machine, parts of the machine being shown in dotted lines; and Fig. 10 is an enlarged fragmentary cross-section of one of the sets of spinning rolls.

Figure 1:
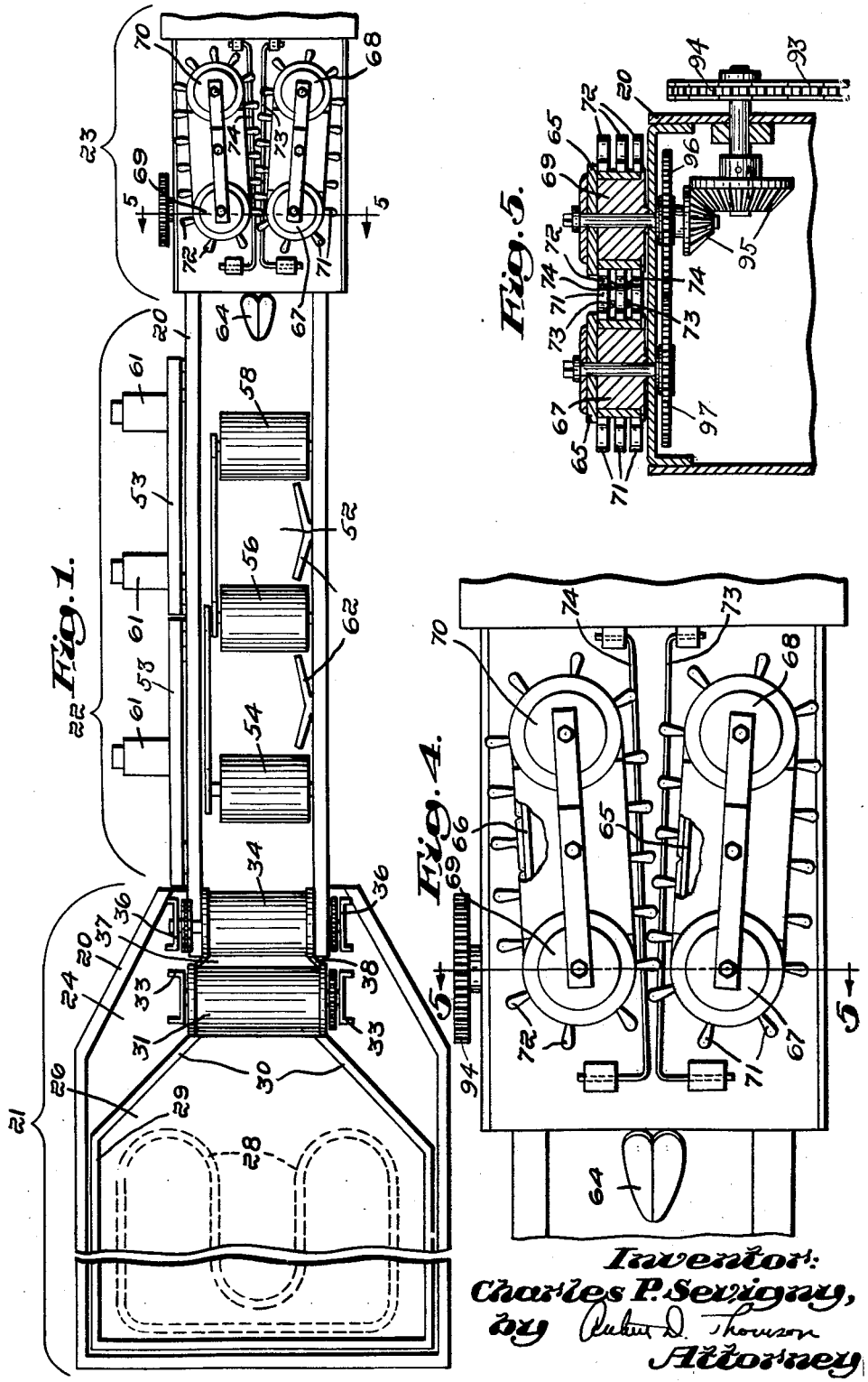
Fig. 1 is a plan view of the essential elements of a machine for making ribbon candy in accordance with the invention, certain parts, including the driving mechanism, being omitted for the sake of clarity.
Figure 2:
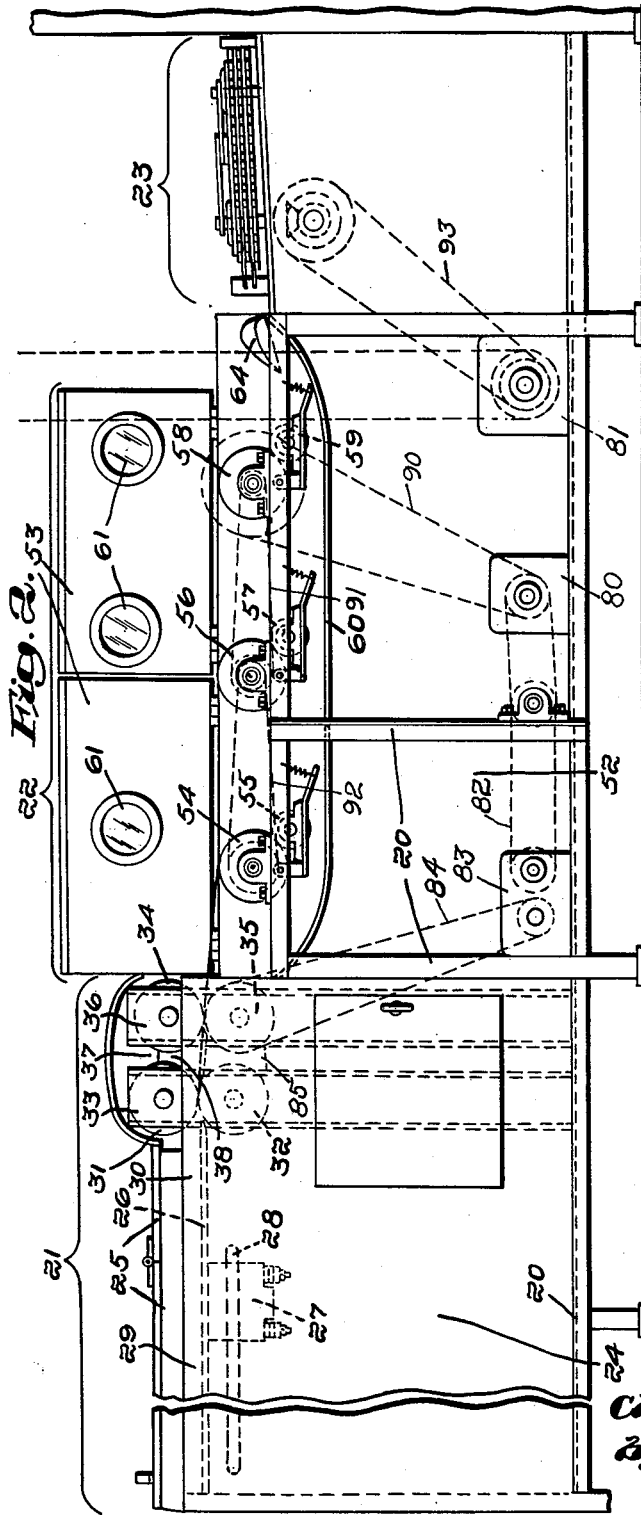
Fig. 2 is a side elevation of the machine, looking upwardly with respect to Fig. 1, and showing chain or belt driving mechanism schematically in broken lines.

As shown in Figs. 1 and 2, the parts of the machine are mounted on a siutable rigid framework generally indicated by the numeral 20. The left-hand part of the machine, generally indicated by the numeral 21, may be referred to as the feeding section, the central part, generally indicated by the numeral 22, as the spinning section, and the right-hand part, generally indicated by the numeral 23, as the crimping section.

Parts of the feeding section are housed in a cabinet 24 having a hinged cover 25. The table 26, which holds the batch of cooked candy, is disposed near the top of the cabinet, and is supported on an electric vibrator unit 27, of any suitable type, for example, of a standard commercial type consisting of a spring-mounted electromagnet energized by pulsating current. Immediately below the table are a set of electric heating coils 28. The table has an upstanding rim 29 around three of its sides, and a pair of upstanding, converging guide walls 30 near its right-hand end.

A pair of pre-feed rolls 31 and 32 are rotatably mounted, one above the other, on posts 33 near the right-hand end of the cabinet. A pair of feed rolls 34 and 35 are rotatably mounted on posts 36 immediately to the right of rolls 31 and 32. Between the pairs of rolls is mounted a guide plate 37 with converging side walls 38. The pre-feed and feed rolls are hollow and air may be circulated through them in any suitable manner to keep them at a temperature slightly below that of the candy and thus prevent the latter from sticking.

As shown in Figs. 6, 7 and 8, the pre-feed rolls 31 and 32 have mating end flanges 39 and 40, respectively. These flanges are accurately machined to provide a throat 41, of predetermined height, between the surfaces of the rolls 31 and 32 in the region of their "bite." Feed rolls 34 and 35, likewise have mating end flanges 42 and 43 which are machined to provide a throat 44 of predetermined height between the surfaces of these rolls in the regions of their "bite." Rolls 34 and 35 are shorter in the axial direction than rolls 31 and 32, and the distance between flanges 42, 43 establishes the width of throat 44. Flanges 39 and 40 are preferably about twice as deep as flanges 42 and 43. Guides 30 are preferably adjustable toward and away from each other to adjust the width of throat 41. For example, the guides may be removably secured to the table by screws or similar fastenings and may be bent and fastened in the desired position. The feed rolls 34 and 35 are preferably driven at approximately twice the rim speed of the pre-feed rolls 31 and 32, in a manner to be further described, and guides 30 are set to make the area of throat 41 about twice that of throat 44, so that the volume of candy passing per minute through the two sets of rolls is about the same. For example, if rolls 34 and 35 are eleven (11) inches wide between their flanges and have flanges $3/32$ inch deep, and rolls 31 and 32 have flanges $3/16$ inch deep, guides 30 would be set to eleven (11) inches width.

The surfaces of pre-feed rolls 31 and 32 are preferably knurled fairly deeply so as to grip the candy firmly. In passing through these rolls the candy is subjected to some pressure and tends to swell on leaving the rolls, because of the pressure of trapped air, especially when the batch has been pulled before it is placed on the table. For this reason, the extra width is provided between flanges 31, 32, and the entrance of guide 37 is preferably somewhat wider than the setting of guides 30. Rolls 34 and 35, as previously stated, are driven at approximately twice the speed of rolls 31 and 32, but may actually be driven slightly faster than this to compensate for the swelling of the candy. Rolls 34 and 35 are not driven fast enough, however, to produce appreciable spinning or drawing of the candy emerging from rolls 31 and 32, as the function of the feeding section of the machine is to shape the candy into a band of uniform width, height and consistency.

The table 26 preferably slopes slightly downward toward the pre-feed rolls 31 and 32, and has a lip 26a which projects part way between the latter. Guide plate 37, likewise, slopes downward toward the feed rolls 34 and 35, which are mounted a little lower than rolls 31 and 32. A batch of candy placed on the table 26, which is maintained at suitable temperature to keep the candy in plastic condition, spreads to form a slab 50 of indeterminate shape. The vibration imparted to the table by vibrator 27, tends to level the slab and keeps it from sticking, so that it will slide easily toward rolls 31 and 32. The feed rolls 31 and 32 gradually draw in candy from the slab, compressing and shaping the candy into a band of the width and height of mouth 41. The band thus formed passes along guide plate 37 between the converging walls 38, and is drawn into rolls 34 and 35. These rolls further reduce the thickness of the band and smooth out any irregularities left after its passage through the pre-feed rolls. The candy emerges from rolls 35 and 36 as a uniform band 51 of the width and thickness corresponding to the size of throat 44.

The band 51 of candy emerging from rolls 34 and 35 enters the spinning section. The parts of this section are mounted in a cabinet 52 having hinged covers 53. Mounted in this cabinet are a first set of spinning rolls 54 and 55, a second set of spinning rolls 56 and 57, and a third set of spinning rolls 58 and 59. Rolls 54, 56 and 58 are mounted on fixed bearings and are driven in a manner hereinafter described. Rolls 55, 57 and 59 are mounted on spring-pressed pivoted brackets and are idler rolls driven only by frictional contact with rolls 54, 56 and 58, or with the candy. As in the case of the pre-feed and feed rolls, the spinning rolls are preferably hollow to permit circulation of air.

The mounting of rolls 56 and 57 is shown in Fig. 10. Rolls 56 has an end plate 56a, provided with vent holes 56b, and carrying a trunnion 56c. The latter is mounted in any suitable type of fixed bearing (not shown) on the frame of the machine. A bracket 45 is pivoted at 46 to a bar 20a which may be part of the frame of the machine. Brackets 45 carries a lug 45a, and its right-hand end is connected to bar 20a by a tension spring 47. Rolls 57 is fitted with an end plate 57a, which carries a trunnion 57b, and may also be provided with vent holes. Trunnion 57b is journalled on lug 45a. The mounting of the opposite ends of these rolls is similar, and the other sets of spinning rolls are mounted in the same manner.

A tray 60 is mounted below the three sets of spinning rolls. A number of infra-red lamps 61 are mounted in the covers to heat the candy in case it becomes too brittle in spinning. A number of air nozzles 62, which may be supplied with cool compressed air from any convenient source (not shown) are mounted in the cabinet and directed to blow air on the sides of the spinning rolls to keep their temperature slightly below that of the candy.

Figure 3:
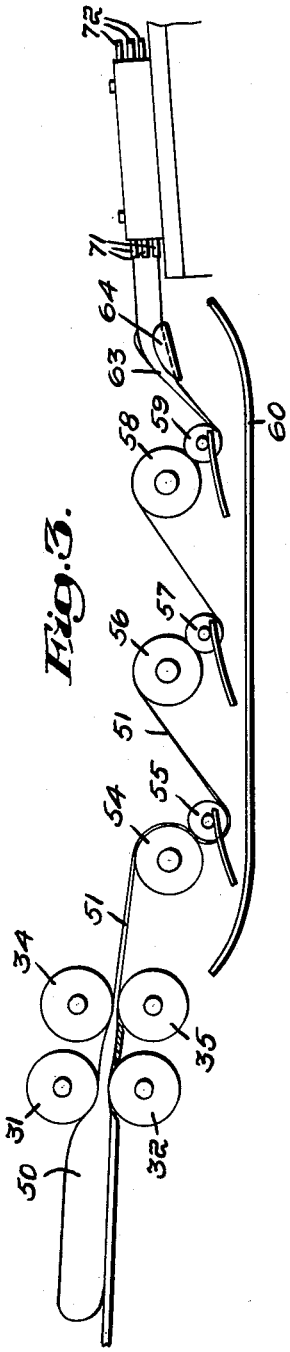
Fig. 3 is a schematic elevation indicating the path of the candy from the batch through the feeding rolls and spinning rolls, and through a ribbon tilting guide, to the crimper.

Each pair of spinning rolls is driven at a faster rim speed than the preceding pair, preferably in a ratio of about two to one. For example, rolls 54 and 55 may run at a rim speed of 722 inches per minute, which is about twice the rim speed of feed rolls 34 and 35; rolls 56 and 57 at a rim speed of 1434 inches per minute, and rolls 58 and 59 at a rim speed of 2860 inches perminute. The band of candy 51 passes between each pair of spinning rolls along the path shown in Fig. 3 and is progressively drawn into ribbon form, emerging from rolls 58 and 59 as a relatively thin, narrow ribbon 63 of the desired finished width and thickness. This rapid drawing process also imparts the lined texture, which is characteristic of spun candy. On leaving rolls 58 and 59, the ribbon 63 enters a guide 64 which turns it up on edge. The ribbon then passes to the crimping section.

The crimping mechanism consists of a pair of belts 65 and 66 running horizontally around pulleys 67 and 68, and 69 and 70, respectively, and carrying sets of crimping fingers 71 and 72. The pulleys are set so that the belts diverge toward the right-hand end of the machine, as viewed in Figs. 1 and 4. Fingers 71 and 72 are staggered so that they mesh in the adjoining regions of the paths of the belts. At the left-hand end, where the initial crimping is performed, the fingers mesh fairly closely. Toward the right end of the two sets the fingers are spaced further apart and serve mainly to carry the crimped candy forward.

As shown in Fig. 5, each of the belts 65 and 66 may carry several spaced tiers of crimping fingers. The tiers are here shown as three in number but a larger number may be employed. In the working region of the belts, stripper wires 73 and 74 are mounted between the tiers of crimping fingers. These wires insure removal of the crimped candy from the meshing fingers and guide the candy as it passes out of the crimper.

The crimping fingers are preferably made of rubber and have rather bulbous ends, so that the candy will not be bent on too sharp a radius. It is understood that the ribbon of candy 63 is still hot and flexible when it enters the crimping mechanism. Each of the crimping fingers is preferably of a height somewhat less than the minimum width of ribbon, which might be encountered, for example, when the last of a batch is being run through. A ribbon narrower than normal will thus be engaged by at least one of the stripper wires and this will not jam in the crimper.

The drive system for the machine, as here illustrated, is preferably controlled by two independent variable speed transmission units 80 and 81 (Fig. 2) which are powered from any convenient source. These transmission units may be of the type known as "Reeves" drives. Unit 80 is connected by a chain and sprocket drive 82, to a gear reduction unit 83, of conventional type, which, in turn, drives the feed and pre-feed rolls through chain and sprocket drives 84 and 85. As shown in Figs. 6 and 7, rolls 31 and 32 are geared together by means of gears 86 and 87, and rolls 34 and 35 are geared together by gears 88 and 89. Unit 80 is also connected, through a chain and sprocket drive 90, to the last set of spinning rolls 58, 59, and thence through chain and sprocket drives 91 and 92 to the other two sets of spinning rolls 56, 57, and 54, 55, respectively. It is understood that the various drives have appropriate speed ratios to produce the desired relationships between the speeds of the rolls, that is, to drive the feed rolls 34, 35 at slightly more than twice the speed of pre-feed rolls 31, 32, spinning rolls 54, 55, at about twice the speed of rolls 34, 35, and each successive pair of spinning rolls at about twice the speed of the preceding pair.

Unit 81 is connected by a chain 93 to sprocket 94, which drives the shaft of pulley 69 through a pair of bevel gears 95. Pulley 69 is geared to pulley 67 by gears 96 and 97, so that the two belts of the crimper are driven in unison.

It is understood that belt drives or gearing may be employed instead of chain and sprocket drives, and that the drive system may be varied. It is preferable, however, in any drive system to have each pair of rolls and the two crimper belts, geared together so as to run accurately in unison. It is also desirable to have the pre-feed, feed and spinning rolls driven from a common main unit so that the correct speed ratios between the various rolls will be maintained regardless of fluctuation in the speed of the main unit. The speed of the spinning rolls may have to be adjusted from time to time according to variations in temperature of the candy. As the speed at which the ribbon 63 must be taken up by the crimper is not directly proportionate to the speed at which the ribbon emerges from the last spinning roll, the speed of the crimper drive should be independently adjustable to ensure best results.

The operation of the machine to form ribbon candy from a batch of hard candy may be summarized as follows:

The table is pre-heated to a suitable temperature, about 140° F. A batch of cooked hard candy, of the type ordinarily used for making ribbon candy, is placed while still hot from cooking and in plastic condition, on table 26. The batch may first be roughly shaped in any ordinary manner such as rolling by hand, into a generally rectangular block. The end of the block is pressed against the prefeed rolls and started through by running the rolls. At the beginning of a run, a band 51 may be pulled manually into a ribbon and fed through the spinning rolls to the crimper. Thereafter the machine runs continuously.

If striped candy is desired a number of differently colored blocks of candy, indicated by the numerals 50a, 50b, 50c, etc. in Fig. 9, are placed side by side with their ends against the prefeed rolls. The blocks, as in the case of a batch of a single color, when kept plastic by the heat of the table, spread to form a flat slab of approximately uniform height and more or less rounded shape at the edges. In the case of striped candy, the heat of the table also assists in fusing the sides of adjoining blocks together.

The temperature of the table is controlled by a suitable thermostatic control mounted inside the cover 25 in any convenient manner. Preferably the heating coils 28 are of sufficient capacity to give a quick response so that the temperature may be kept within a few degrees variation.

The cover 25, which is ordinarily kept closed while the machine is running, protects the batch from drafts and makes it possible to maintain the atmosphere around the batch at an even temperature. The entire batch thus remains in usable condition, whereas in making ribbon candy according to previous practices, the end of the batch frequently "freezes" before it can be pulled, and must be discarded as scrap.

Once a batch is started through the machine, the candy is drawn continuously into prefeed rolls 31, 32, and is first compressed and formed into a band the size of throat 41 and then passes to rolls 34, 35 which form it into a band 51 which is the size of throat 44. The band thus formed is drawn continuously through the spinning rolls to the crimper. During the spinning operation the candy is kept at the correct temperature. The finished ribbon candy may be passed continuously to a table where it is cut into lengths and packed in boxes.

As soon as one batch is nearly through, the operator opens the cover 25 momentarily and places another batch on the table, pressing the end of the second batch onto the remainder of the first. The two batches become sufficiently fused together so that the second batch is drawn into rolls 31, 32 when the first is finished, and the operation of the machine continues without interruption.

The formation of the candy first into a band of predetermined size and then into a ribbon produces candy of much more uniform quality and dimensions than can be produced by methods previously used. Stripes in the candy come out quite even, as the different colored parts tend to travel along their original relationship, as indicated in Fig. 9. In hand spinning, for example, the operator grasps a piece of candy between his thumb, and finger and pulls a ribbon directly from the batch, using first one hand and then the other. Even a highly skilled operator cannot pull the candy in this manner to uniform dimensions, whereas, candy produced on the machine here described is so uniform in width and thickness that the weight of boxes filled with the same number of pieces of the same length is substantially uniform. The packing of the boxes, as well as the manufacture of the candy, is thus much easier and faster.

The machine can be tended by a single relatively unskilled operator, whereas at least two and sometimes three highly skilled operators are required for handling and spinning a batch of ribbon candy by previous methods. Furthermore the production of candy by this machine is much cleaner and more sanitary, as the candy is handled very little and is not exposed to dust during its travel through the machine. The elimination of waste and the reduction in labor required results in considerable economy.

It is understood that the machine may be varied, for example, by using an additional set of prefeed rolls to insure accuracy in sizing a band drawn from unshaped batches, or by increasing or reducing the number of spinning rolls according to the thickness desired in the finished ribbon. Electric or other suitable heating means may be used for heating the table, and the various parts can be driven by belts or gearing. The particular machine here illustrated is merely an example of one embodiment of the invention defined in the appended claims.

What is claimed is:

1. A machine, for making ribbon candy, comprising a table adapted to support a hot batch of candy in plastic condition, means for heating said table so as to maintain in plastic condition a batch placed thereon, a first pair of cylindrical feed rolls mounted adjacent said table, guide means defining with said rolls a first substantially rectangular mouth of predetermined height and width, means for driving said first pair of rolls to draw candy from a batch placed on said table continuously through said first mouth, thereby forming the candy into a flat band of substantially the height and width of said mouth, a second pair of cylindrical feed rolls having surfaces defining a second substantially rectangular mouth of lesser height than said first mouth, means for driving said second pair of rolls to advance the band of candy received from said first pair, said pairs of rolls being driven at speeds approximately inversely proportionate to the areas of their respective mouths, a succession of pairs of spinning rolls adapted to receive the band from said second pair of feed rolls, means for resiliently urging each of said pairs of spinning rolls toward each other to grip said band between them, and means for driving each of said pairs of spinning rolls at a peripheral speed sufficiently greater than that of the preceding pair to apply tension to the band, whereby the band is progressively stretched into a thin ribbon.

2. A machine as described in claim 1, each of said feed rolls having flanges in rolling engagement with the flanges of the other roll of the pair, and said flanges fixing the heights of the respective mouths.

3. A machine as described in claim 1, having a crimping mechanism comprising a pair of endless belts mounted to receive between them a ribbon of candy emerging from said succession of pairs of spinning rolls, said belts running adjacent to each other over a portion of their paths, a number of loop-shaping crimping fingers mounted on said belts and arranged to intermesh in staggered relationship in said portion, and means for driving said belts to draw the ribbon continuously between said intermeshing fingers.

References Cited in the file of this patent

UNITED STATES PATENTS

| | | |
|---|---|---|
| 755,343 | Barratt | Mar. 22, 1904 |
| 763,329 | Rowntree | June 21, 1904 |
| 866,946 | Magruder | Sept. 24, 1907 |
| 1,166,610 | Lovelady et al. | Jan. 4, 1916 |
| 1,542,710 | Laskey | June 16, 1925 |
| 1,572,071 | Laskey | Feb. 9, 1926 |
| 1,576,339 | Laskey | Mar. 9, 1926 |
| 1,577,934 | Pearce | Mar. 23, 1926 |
| 2,264,115 | Grainger et al. | Nov. 25, 1941 |